(12) United States Patent
Baudendistel

(10) Patent No.: US 7,093,499 B2
(45) Date of Patent: Aug. 22, 2006

(54) FORCE SENSOR, STRAIN SENSOR AND METHODS FOR MEASURING SAME

(75) Inventor: Thomas A. Baudendistel, Farmersville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/018,330

(22) Filed: Dec. 21, 2004

(65) Prior Publication Data

US 2006/0137464 A1  Jun. 29, 2006

(51) Int. Cl.
*G01B 7/16* (2006.01)

(52) U.S. Cl. ............... 73/779; 73/862.69; 324/209
(58) Field of Classification Search ........... 310/120; 73/779, 862.69; 324/209
See application file for complete search history.

(56) References Cited

U.S. PATENT DOCUMENTS 4,920,806 A * 5/1990 Obama et al. ............... 73/779

FOREIGN PATENT DOCUMENTS

| WO | WO 98/33193 | 7/1998 |
| WO | WO 99/38173 | 7/1999 |
| WO | WO 00/79546 | 12/2000 |

* cited by examiner

*Primary Examiner*—David M. Gray
*Assistant Examiner*—Lori Moorman
(74) *Attorney, Agent, or Firm*—Scott A. McBain

(57) ABSTRACT

A force sensor, or a method, determines a force using at least a measured inductance in a coil wherein a quantum tunneling composite is located in a magnetic path created by the coil, is positioned in a load path of the force, and is under strain from the force. A strain sensor, or a method, determines a strain using at least a measured inductance in a coil wherein a quantum tunneling composite is located in a magnetic path created by the coil, is positioned in a load path of a force, and is under strain from the force.

18 Claims, 2 Drawing Sheets

FORCE SENSOR, STRAIN SENSOR AND METHODS FOR MEASURING SAME

TECHNICAL FIELD

The present invention relates generally to sensors and methods for sensing, and more particularly to a force sensor, to a strain sensor, to a method for measuring a force, and to a method for measuring a strain.

BACKGROUND OF THE INVENTION

Conventional force sensors include those which place a quantum tunneling composite (QTC) in a load path of a force to be under strain from the force. The electrical resistance of the quantum tunneling composite changes with changes in the force. The conventional QTC force sensors determine the force from a measurement of the electrical resistance. The conventional QTC force sensor is suited to measuring a "point force" at a "point location" on the QTC material because the electrical resistance of the QTC material undergoes a change from applying a point force to a point location on the QTC material but additional loads will reduce the overall resistance of the QTC material (i.e., the QTC material acts like a plurality of resistors connected in parallel). QTC force sensors and quantum tunneling composites (i.e., QTC materials) are available from Peratech Ltd whose www website is peratech.co.uk. Known QTC materials include those whose electrical resistance is temperature dependent.

Conventional strain gages include those which rely on a change in electrical resistance of a resistor placed under strain. Other conventional methods to measure strain using SAW (surface acoustic wave) technology or magnetostrictive materials are known.

What is needed is an improved force sensor and an improved strain sensor and methods for measuring same.

SUMMARY OF THE INVENTION

An embodiment of a force sensor of the invention includes a coil, a quantum tunneling composite, and an inductance measuring assembly. The coil is adapted to carry an electric current. The quantum tunneling composite is electrically insulated from the coil, located in a magnetic path created by the coil when an alternating current is present in the coil, and positionable in a load path of a force to be under strain from the force. The inductance measuring assembly is operatively connected to the coil to measure an inductance in the coil when the alternating current is present in the coil and when the quantum tunneling composite is disposed in the load path of the force to be under strain from the force. The force sensor determines the force using at least the measured inductance in the coil.

A method of the invention for measuring a force includes several steps. One step includes obtaining a coil assembly including a coil and a quantum tunneling composite, wherein the coil is adapted to carry an electric current, and wherein the quantum tunneling composite is electrically insulated from the coil and is disposed in a magnetic path created by the coil when an alternating current is present in the coil. Another step includes positioning the coil assembly with the quantum tunneling composite in a load path of a force and under strain from the force. An additional step includes measuring an inductance in the coil when the alternating current is present in the coil and when the quantum tunneling composite is disposed in the load path of the force and under strain from the force. A further step includes determining the force using at least the measured inductance in the coil.

An embodiment of a strain sensor of the invention includes a coil, a quantum tunneling composite, and an inductance measuring assembly. The coil is adapted to carry an electric current. The quantum tunneling composite is electrically insulated from the coil, located in a magnetic path created by the coil when an alternating current is present in the coil, and positionable in a load path of a force to be under strain from the force. The inductance measuring assembly is operatively connected to the coil to measure an inductance in the coil when the alternating current is present in the coil and when the quantum tunneling composite is positioned in the load path of the force to be under strain from the force. The strain sensor determines the strain using at least the measured inductance in the coil.

A method of the invention for measuring a strain includes several steps. One step includes obtaining a coil assembly including a coil and a quantum tunneling composite, wherein the coil is adapted to carry an electric current, and wherein the quantum tunneling composite is electrically insulated from the coil and is located in a magnetic path created by the coil when an alternating current is present in the coil. Another step includes positioning the coil assembly with the quantum tunneling composite in a load path of a force and under strain from the force. An additional step includes measuring an inductance in the coil when the alternating current is present in the coil and when the quantum tunneling composite is positioned in the load path of the force and under strain from the force. A further step includes determining the strain using at least the measured inductance in the coil.

Several benefits and advantages are derived from one or more of the methods and expressions of the embodiments of the invention. The measured inductance is an average inductance of the coil which changes equally with the addition of equal point loads allowing an average force to be determined. Applicant has successfully performed a proof of principle experiment demonstrating the workability of an example of the method for measuring a force.

DETAILED DESCRIPTION

Figure 1:
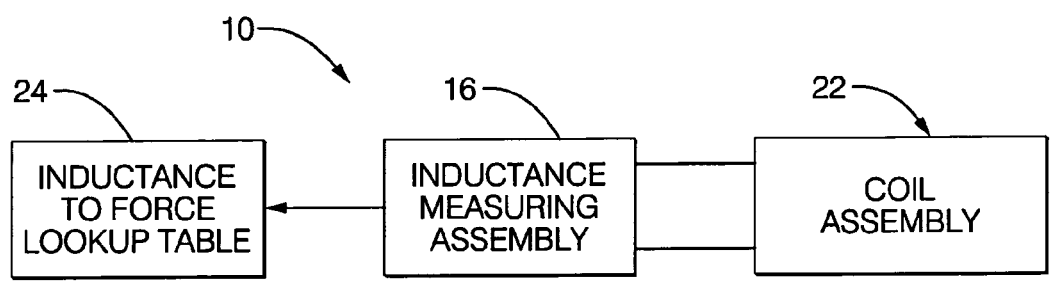
FIG. 1 is a schematic side elevational view of an embodiment of a force sensor of the invention.
Figure 2:
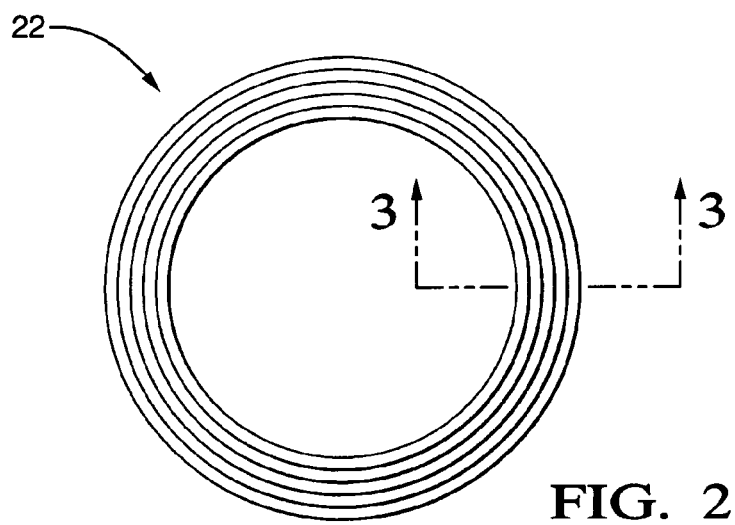
FIG. 2 is a top elevational view of the coil assembly of FIG. 1.
Figure 3:
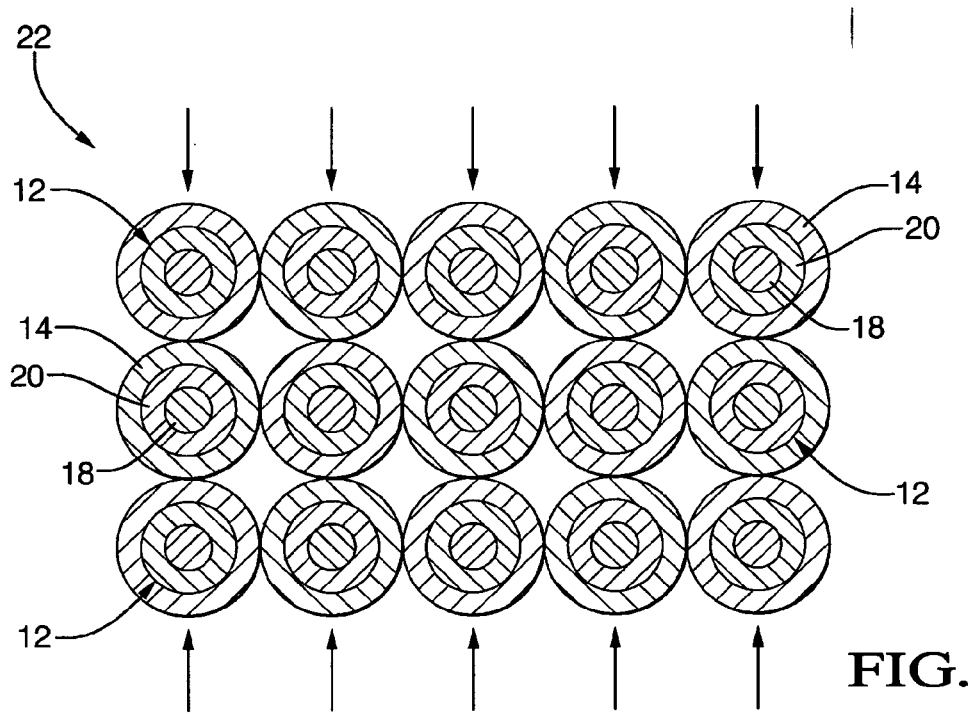
FIG. 3 is a cross-sectional view of a portion of the coil assembly of FIG. 2 taken along lines 3—3 in FIG. 2.

Referring now to the drawing, FIGS. 1–3 show an embodiment of a force sensor 10 of the present invention. A first expression of the embodiment of FIGS. 1–3 is a force sensor 10 which includes a coil 12, a quantum tunneling composite 14, and an inductance measuring assembly 16. The coil 12 is adapted to carry an electric current. The quantum tunneling composite 14 is electrically insulated from the coil 12, is disposed in a magnetic path created by the coil 12 when an alternating current is present in the coil 12, and is disposable in a load path of a force (indicated by the unnumbered arrows in FIG. 3) to be under strain from the force. The inductance measuring assembly 16 is operatively connected to the coil 12 to measure an inductance in the coil 12 when the alternating current is present in the coil 12 and when the quantum tunneling composite 14 is disposed in the load path of the force to be under strain from the force, wherein the force sensor 10 determines the force using at least the measured inductance in the coil 12.

It is noted that for the purposes of describing the first expression of the embodiment of FIGS. 1–3, the term "force" includes, without limitation, force per unit area (pressure). It is also noted that the direction of the load path of the force can be any direction with respect to the coil 12 provided that the force places the quantum tunneling composite 14 in strain.

In one application of the first expression of the embodiment of FIGS. 1–3, the inductance measuring assembly 16 supplies the alternating current to the coil 12. In one deployment of the first expression of the embodiment of FIGS. 1–3, the quantum tunneling composite 14 has a temperature, and the force sensor 10 determines the force using at least the temperature of the quantum tunneling composite 14 and the measured inductance in the coil 12.

In one construction of the embodiment of FIGS. 1–3, the coil 12 comprises a conductor 18 surrounded by electrical insulation 20. In one variation, the quantum tunneling composite 14 surrounds the electrical insulation 20. In this variation, the turns of the conductor 18 together with the surrounding electrical insulation 20 together with the surrounding quantum tunneling composite 14 are referred to as a coil assembly 22. In one modification, the quantum tunneling composite 14 is molded to the electrical insulation 20 and is said to be electrically insulated from the coil 12 because it is electrically insulated from the conductor 18 of the coil 12. In another construction, not shown, the quantum tunneling composite is disposed inside a non-helical or helical coil with the coil surrounding the quantum tunneling composite and with the quantum tunneling composite attached to or spaced apart from the coil. In a further construction, not shown, the quantum tunneling composite is disposed outside a non-helical or helical coil to surround the coil with the quantum tunneling composite attached to or spaced apart from the coil. Other constructions are left to the artisan.

In one implementation of the embodiment of FIGS. 1–3, the force sensor 10 also includes a lookup table 24 which converts inductance to force. In one variation, the lookup table 24 is an analog or digital circuit. In another variation, the lookup table 24 is stored in computer memory. In one example, the lookup table 24 is empirically determined for the particular force sensor by noting measured inductances for known applied forces. Other implementations for converting inductance to force are left to the artisan.

Figure 4:
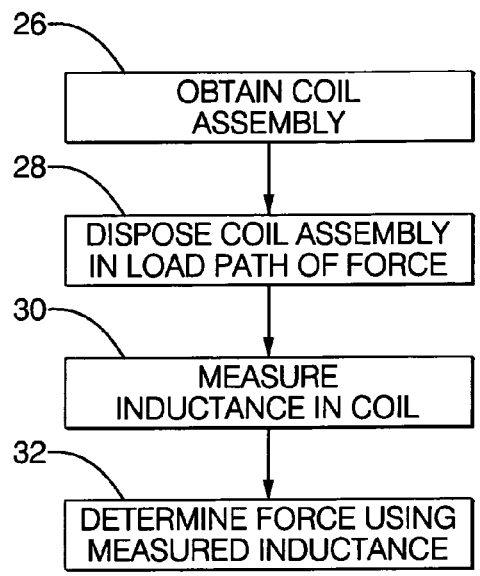
FIG. 4 is a block diagram of a method of the invention for measuring a force.

A method of the invention for measuring a force is shown in FIG. 4 and includes steps a) through d). Step a) is labeled as "Obtain Coil Assembly" in block 26 of FIG. 4. Step a) includes obtaining a coil assembly 22 including a coil 12 and a quantum tunneling composite 14, wherein the coil 12 is adapted to carry an electric current, and wherein the quantum tunneling composite 14 is electrically insulated from the coil 12 and is disposed in a magnetic path created by the coil 12 when an alternating current is present in the coil 12. Step b) is labeled "Dispose Coil Assembly In Load Path Of Force" in block 28 of FIG. 4. Step b) includes disposing the coil assembly 22 with the quantum tunneling composite 14 in a load path of a force and under strain from the force. Step c) is labeled "Measure Inductance In Coil" in block 30 of FIG. 4. Step c) includes measuring an inductance in the coil 12 when the alternating current is present in the coil 12 and when the quantum tunneling composite 14 is disposed in the load path of the force and under strain from the force. Step d) is labeled as "Determine Force Using Measured Inductance" in block 32 of FIG. 4. Step d) includes determining the force using at least the measured inductance in the coil 12.

In one employment of the method for measuring a force, the quantum tunneling composite 14 has a temperature, and step d) determines the force using at least the temperature of the quantum tunneling composite 14 and the measured inductance in the coil 12. In one implementation of the method for measuring a force, the coil 12 is an insulated coil having a conductor 18 surrounded by electrical insulation 20. In one variation, the quantum tunneling composite 14 surrounds and is attached to the electrical insulation 20. Other implementations and variations, including those wherein, in the coil assembly 22, the quantum tunneling composite 14 is not attached to the coil 12, are left to the artisan.

Figure 5:
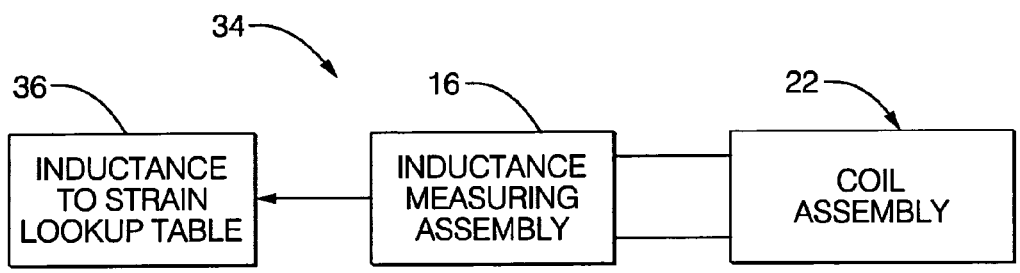
FIG. 5 is a schematic side elevational view of an embodiment of a strain sensor of the invention.

Referring again to the drawing, FIG. 5 shows an embodiment of a strain sensor 34 of the present invention. A first expression of the embodiment of FIG. 5 is a strain sensor 34 which includes a coil 12, a quantum tunneling composite 14, and an inductance measuring assembly 16. The coil 12 is adapted to carry an electric current. The quantum tunneling composite 14 is electrically insulated from the coil 12, is disposed in a magnetic path created by the coil 12 when an alternating current is present in the coil 12, and is disposable in a load path of a force to be under strain from the force. The inductance measuring assembly 16 is operatively connected to the coil 12 to measure an inductance in the coil 12 when the alternating current is present in the coil 12 and when the quantum tunneling composite 14 is disposed in the load path of the force to be under strain from the force, wherein the strain sensor 34 determines the strain using at least the measured inductance in the coil 12.

It is noted that for the purposes of describing the first expression of the embodiment of FIG. 5, the term "strain" includes, without limitation, change in dimension. It is also noted that the direction of the load path of the force can be any direction with respect to the coil 12 provided that the force places the quantum tunneling composite 14 in strain.

In one application of the first expression of the embodiment of FIG. 4, the inductance measuring assembly 16 supplies the alternating current to the coil 12. In one deployment of the first expression of the embodiment of FIG. 4, the quantum tunneling composite 14 has a temperature, and the force sensor 10 determines the force using at least the temperature of the quantum tunneling composite 14 and the measured inductance in the coil 12.

In one construction of the coil 12 of the embodiment of FIG. 4 (such coil construction being identical to that shown in FIGS. 2 and 3), the coil 12 comprises a conductor 18 surrounded by electrical insulation 20. In one variation, the quantum tunneling composite 14 surrounds the electrical insulation 20. In this variation, the turns of the conductor 18 together with the surrounding electrical insulation 20 together with the surrounding quantum tunneling composite 14 are referred to as a coil assembly 22. In one modification, the quantum tunneling composite 14 is molded to the electrical insulation 20 and is said to be electrically insulated from the coil 12 because of the electrical insulation 20. In another construction, not shown, the quantum tunneling composite is disposed inside a non-helical or helical coil with the coil surrounding the quantum tunneling composite and with the quantum tunneling composite attached to or spaced apart from the coil. In a further construction, not shown, the quantum tunneling composite is disposed outside a non-helical or helical coil to surround the coil with the quantum tunneling composite attached to or spaced apart from the coil. Other constructions are left to the artisan.

In one implementation of the embodiment of FIG. 4, the strain sensor 34 also includes a lookup table 36 which converts inductance to strain. In one variation, the lookup table 36 is an analog or digital circuit. In another variation, the lookup table 36 is stored in computer memory. In one example, the lookup table 36 is empirically determined for the particular strain sensor by noting measured inductances for known strains. Other implementations for converting inductance to strain are left to the artisan.

Figure 6:
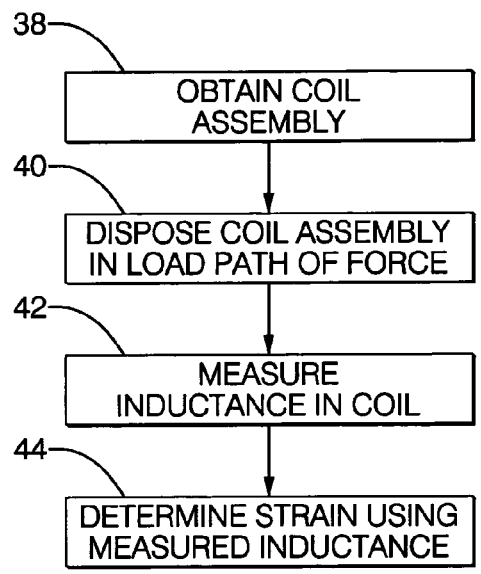
FIG. 6 is a block diagram of a method of the invention for measuring a strain.

A method of the invention for measuring a strain is shown in FIG. 6 and includes steps a) through d). Step a) is labeled as "Obtain Coil Assembly" in block 38 of FIG. 6. Step a) includes obtaining a coil assembly 22 including a coil 12 and a quantum tunneling composite 14, wherein the coil 12 is adapted to carry an electric current, and wherein the quantum tunneling composite 14 is electrically insulated from the coil 12 and is disposed in a magnetic path created by the coil 12 when an alternating current is present in the coil 12. Step b) is labeled "Dispose Coil Assembly In Load Path Of Force" in block 40 of FIG. 6. Step b) includes disposing the coil assembly 22 with the quantum tunneling composite 14 in a load path of a force and under strain from the force. Step c) is labeled "Measure Inductance In Coil" in block 42 of FIG. 6. Step c) includes measuring an inductance in the coil 12 when the alternating current is present in the coil 12 and when the quantum tunneling composite 14 is disposed in the load path of the force and under strain from the force. Step d) is labeled as "Determine Strain Using Measured Inductance" in block 44 of FIG. 6. Step d) includes determining the strain using at least the measured inductance in the coil 12.

In one employment of the method for measuring a strain, the quantum tunneling composite 14 has a temperature, and step d) determines the strain using at least the temperature of the quantum tunneling composite 14 and the measured inductance in the coil 12. In one implementation of the method for measuring a strain, the coil 12 is an insulated coil having a conductor 18 surrounded by electrical insulation 20. In one variation, the quantum tunneling composite 14 surrounds and is attached to the electrical insulation 20. Other implementations and variations, including those wherein, in the coil assembly 22, the quantum tunneling composite 14 is not attached to the coil 12, are left to the artisan.

Several benefits and advantages are derived from one or more of the methods and expressions of the embodiments of the invention. The measured inductance is an average inductance of the coil which changes equally with the addition of equal point loads allowing an average force to be determined. Applicant has successfully performed a proof of principle experiment demonstrating the workability of an example of the method for measuring a force.

The foregoing description of several expressions of embodiments and methods of the invention has been presented for purposes of illustration. It is not intended to be exhaustive or to limit the invention to the precise form and steps disclosed, and obviously many modifications and variations are possible in light of the above teaching. It is intended that the scope of the invention be defined by the claims appended hereto.

The invention claimed is:

1. A force sensor comprising:
   a) a coil adapted to carry an electric current;
   b) a quantum tunneling composite electrically insulated from the coil, disposed in a magnetic path created by the coil when an alternating current is present in the coil, and disposable in a load path of a force to be under strain from the force; and
   c) an inductance measuring assembly operatively connected to the coil to measure an inductance in the coil when the alternating current is present in the coil and when the quantum tunneling composite is disposed in the load path of the force to be under strain from the force, wherein the force sensor determines the force using at least the measured inductance in the coil.

2. The force sensor of claim 1, wherein the inductance measuring assembly supplies the alternating current to the coil.

3. The force sensor of claim 1, wherein the coil comprises a conductor surrounded by electrical insulation.

4. The force sensor of claim 3, wherein is the quantum tunneling composite surrounds the electrical insulation.

5. The force sensor of claim 4, wherein the quantum tunneling composite is molded to the electrical insulation.

6. A method for measuring a force comprising the steps of:
   a) obtaining a coil assembly including a coil and a quantum tunneling composite, wherein the coil is adapted to carry an electric current, and wherein the quantum tunneling composite is electrically insulated from the coil and is disposed in a magnetic path created by the coil when an alternating current is present in the coil;
   b) disposing the coil assembly with the quantum tunneling composite in a load path of a force and under strain from the force;
   c) measuring an inductance in the coil when the alternating current is present in the coil and when the quantum tunneling composite is disposed in the load path of the force and under strain from the force; and
   d) determining the force using at least the measured inductance in the coil.

7. The method of claim 6, wherein the step of determining the force using at least the measured inductance in the coil determines the force using at least the temperature of the quantum tunneling composite and the measured inductance in the coil.

8. The method of claim 6, wherein the coil is an insulated coil having a conductor surrounded by electrical insulation.

9. The method of claim 8, wherein the quantum tunneling composite surrounds and is attached to the electrical insulation.

10. A strain sensor comprising:
    a) a coil adapted to carry an electric current;
    b) a quantum tunneling composite electrically insulated from the coil, disposed in a magnetic path created by the coil when an alternating current is present in the coil, and disposable in a load path of a force to be under strain from the force; and
    c) an inductance measuring assembly operatively connected to the coil to measure an inductance in the coil when the alternating current is present in the coil and when the quantum tunneling composite is disposed in the load path of the force to be under strain from the force, wherein the strain sensor determines the strain using at least the measured inductance in the coil.

11. The strain sensor of claim 10, wherein the inductance measuring assembly supplies the alternating current to the coil.

12. The strain sensor of claim 10, wherein the coil comprises a conductor surrounded by electrical insulation.

13. The strain sensor of claim 12, wherein is the quantum tunneling composite surrounds the electrical insulation.

14. The strain sensor of claim 13, wherein the quantum tunneling composite is molded to the electrical insulation.

15. A method for measuring a strain comprising the steps of:
   a) obtaining a coil assembly including a coil and a quantum tunneling composite, wherein the coil is adapted to carry an electric current, and wherein the quantum tunneling composite is electrically insulated from the coil and is disposed in a magnetic path created by the coil when an alternating current is present in the coil;
   b) disposing the coil assembly with the quantum tunneling composite in a load path of a force and under strain from the force;
   c) measuring an inductance in the coil when the alternating current is present in the coil and when the quantum tunneling composite is disposed in the load path of the force and under strain from the force; and
   d) determining the strain using at least the measured inductance in the coil.

16. The method of claim 15, wherein the step of determining the strain using at least the measured inductance in the coil determines the strain using at least the temperature of the quantum tunneling composite and the measured inductance in the coil.

17. The method of claim 15, wherein the coil is an insulated coil having a conductor surrounded by electrical insulation.

18. The method of claim 17, wherein the quantum tunneling composite surrounds and is attached to the electrical insulation.

* * * * *